F. J. BAUR.
RATE FINDER.
APPLICATION FILED SEPT. 15, 1913.
1,129,033.
Patented Feb. 16, 1915.
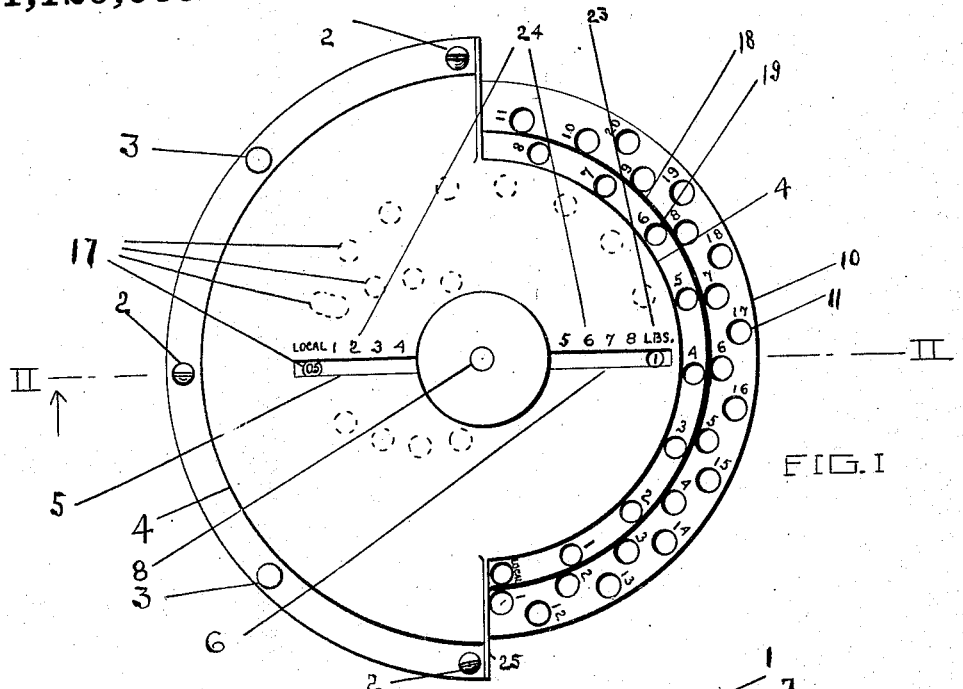
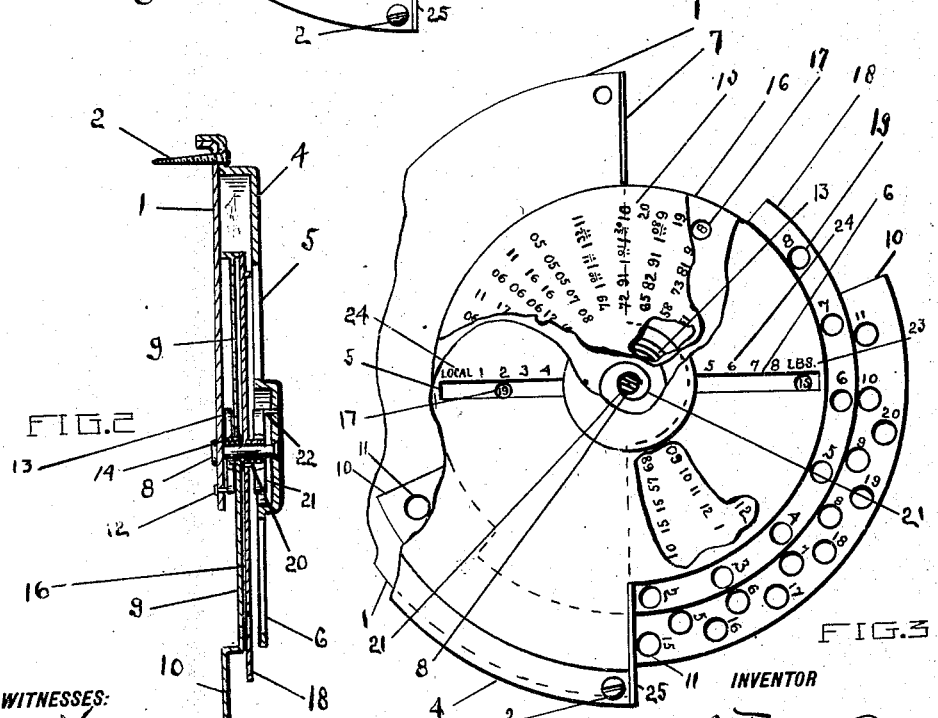
WITNESSES:
Gladys Jamison
A. H. Rauch
INVENTOR
Frederick J. Baur
BY
Geo. E. Kirk
ATTORNEY

UNITED STATES PATENT OFFICE.

FREDERICK J. BAUR, OF LUCAS COUNTY, OHIO, ASSIGNOR OF ONE-THIRD TO JACOB KOHN AND ONE-THIRD TO SAMUEL KOHN, BOTH OF TOLEDO, OHIO.

RATE-FINDER.

1,129,033.

Specification of Letters Patent.   Patented Feb. 16, 1915.

Application filed September 15, 1913.   Serial No. 789,766.

*To all whom it may concern:*

Be it known that I, FREDERICK J. BAUR, a citizen of the United States, residing in Lucas county, Ohio, have invented new and useful Rate-Finders, of which the following is a specification.

This invention has utility in connection with the ready determination of the relation of quantities, and as disclosed, has a further feature of automatic check as to the quantities taken.

This invention may be conveniently embodied as a rate finder, as in parcel post service, being disclosed to determine at a single movement of the operator the rate for a number of pounds in a certain zone.

Referring to the drawings: Figure 1 is a front elevation of the device as embodied in a parcel post rate finder; Fig. 2 is a section on the line II—II, Fig. 1, and Fig. 3 is a view similar to Fig. 1, with parts broken away, and with the movable members shifted to give a rate determination.

The base or mounting plate 1 may be attached to a wall or other support by the screws 2, which screws 2 may serve with the rivets 3 to carry in assembled relation to the plate 1, the outer housing plate 4. This outer housing plate 4 has the sight openings or slots 5, 6, for rate total indications. The back or mounting plate 1 has the stop 7 for determining the recover limit of movement or travel of the movable members disposed between the housing plates.

Connecting the housing plates 1, 4, is the central bearing or pin 8 loosely mounted on which is the disk 9. By the pin 12, spring 13 is connected to the back housing plate 1, while the pin 14 connects this spiral spring 13 to the disk 9, thereby serving normally to keep this disk member 9 with its extension 10 abutting the stop 7 of the plate 1. The extension 10 has a set of quantity graduations, in this instance pounds, with finger openings 11 to permit ready definite actuation of the member 9 upon its axis bearing 8 against the resistance of the spring 13. This member 9 has thereon in a common line the weight and rate totals for such weight in each of the postal zones. As the member 9 is rotative, a convenient disposal of these graduations or quantity indications 15 is diametrically.

Spaced from the member 9 and coaxial therewith is the second movable member 16, which also has the central bearing 8. The disk member 16 has openings 17 therethrough to expose certain weight and zone totals of the quantities 15 on the member 9. The member 16 is also provided with an extension 18 spaced from the extension 10 of the member 9, to permit ready insertion of the fingers of the operator in the indications 19 for ready definite zone determinations. Engaging the member 16 is the pin 20 connected to the spiral spring 21 the opposite end of which spring 21 is connected by the pin 22 to the front housing plate 4. Accordingly this spring 22 normally keeps the zone member 16 in first or local rate place against the stop 7 on the plate 1, as is the member 9 kept in one pound position against the same stop 7.

At the right hand limit of the slot or sight opening 6, the member 16 discloses at indication 23, the check of weight quantity shifted in the movement of the member 9, while the indications 24 along the remaining extent of the openings 5, 6, disclose the zone quantity or designation shifted by the member 16, this check being at the point of rate total display. There is accordingly a double automatic check of each of the elements entering into the total, all displayed at a single glance, and obtained by most simple manipulation. With one hand, one finger may be inserted into an opening 11 for pounds, a second finger inserted into an opening 19, even during movement of the hand, as the skilled operator pulls both disk members until the fingers come against the lower stop 25. This stop 25 gives a definite limit, and the display is of numbers well centered for easy reading. Upon release of the mechanism by withdrawing the fingers, the springs 13 and 22, at once effect a recovery of the members 9, 16, and with no delay the rate finder is available for the next operation.

The simplicity of the mechanism and the accuracy and clearness of determinations contribute to the efficiency and reliability of the device in practice.

What is claimed and it is desired to secure by Letters Patent is:

1. The combination in a computing device of a support, a pair of relatively movable members each provided with indicating means and a plurality of independently selectable starting-position finger engaging portions adjacent the means for different distances of actuation, said members being parallel one in front of the other, the front member having openings therethrough, the other member having resultant disclosing indications, a housing provided by the support having an opening disclosing the front member opening and its registry with the other member resultant indication, and a finger abutment limiting the actuating of both members by engaging the operator's fingers moving the members, thereby disclosing the computation at once upon full actuation of the members from starting positions.

2. The combination in a computing device of a support, a pair of relatively movable members each provided with indicating means and a plurality of independently selectable starting position finger engaging portions adjacent the means for different distances of actuation, said members being parallel one in front of the other, the front member having openings therethrough, the other member having resultant disclosing indications, a housing provided by the support having an opening disclosing the front member opening and its registry with the other member resultant indication, a finger abutment limiting the actuating of both members by engaging the operator's fingers moving the members, thereby disclosing the computation at once upon full actuation of the members from starting positions, and corroborative check disclosure means of the selected actuations of the members in addition to the seat indications.

In witness whereof I affix my signature in the presence of two witnesses.

FREDERICK J. BAUR.

Witnesses:
  GEO. E. KIRK,
  J. E. ALVORD.